United States Patent
Bogner et al.

(10) Patent No.: US 8,598,776 B2
(45) Date of Patent: Dec. 3, 2013

(54) HEADLIGHT COMPRISING A PLURALITY OF LUMINESCENCE DIODE EMITTERS

(75) Inventors: Georg Bogner, Lappersdorf (DE); Joachim Reill, Zeitlam (DE); Thomas Zeiler, Nittendorf (DE)

(73) Assignee: OSRAM Opto Semiconductors GmbH (DE)

( * ) Notice: Subject to any disclaimer, the term of this patent is extended or adjusted under 35 U.S.C. 154(b) by 270 days.

(21) Appl. No.: 13/121,286

(22) PCT Filed: Aug. 12, 2009

(86) PCT No.: PCT/DE2009/001153
§ 371 (c)(1),
(2), (4) Date: May 12, 2011

(87) PCT Pub. No.: WO2010/034276
PCT Pub. Date: Apr. 1, 2010

(65) Prior Publication Data
US 2012/0113668 A1    May 10, 2012

(30) Foreign Application Priority Data
Sep. 29, 2008  (DE) .......................... 10 2008 049 398

(51) Int. Cl.
*H05B 33/02*  (2006.01)
(52) U.S. Cl.
USPC .......................................... 313/500; 313/501
(58) Field of Classification Search
USPC .................................. 362/465; 313/500, 501
See application file for complete search history.

(56) References Cited

U.S. PATENT DOCUMENTS

| | | | |
|---|---|---|---|
| 5,917,252 A | 6/1999 | Tokunaga |
| 6,111,272 A | 8/2000 | Heinen |
| 2002/0017652 A1 | 2/2002 | Illek et al. |
| 2004/0263346 A1 | 12/2004 | Neal |
| 2006/0239024 A1 | 10/2006 | Valcamp et al. |
| 2007/0252504 A1 | 11/2007 | Konno et al. |
| 2008/0013329 A1 | 1/2008 | Takeda et al. |
| 2008/0062706 A1 | 3/2008 | Feldmeier |

FOREIGN PATENT DOCUMENTS

| | | |
|---|---|---|
| DE | 37 23 299 A1 | 1/1989 |
| DE | 39 31 262 A1 | 3/1991 |
| DE | 697 05 002 T2 | 2/2002 |
| EP | 0 905 797 A2 | 3/1999 |
| JP | 2002-270011 A | 9/2002 |
| JP | 2008-10228 A | 1/2008 |
| JP | 2008-537315 | 9/2008 |
| JP | 2009-224191 | 10/2009 |
| WO | 02/13281 A1 | 2/2002 |
| WO | 2007/125772 A1 | 11/2007 |

OTHER PUBLICATIONS

I. Schnitzer et al., "30% external Quantum efficiency from surface textured, thin-film light-emitting diodes," Appl. Phys. Lett., vol. 63, No. 16, Oct. 18, 1993, pp. 2174-2176.

*Primary Examiner* — Joseph L Williams
(74) *Attorney, Agent, or Firm* — DLA Piper LLP (US)

(57) ABSTRACT

A headlight includes a plurality of luminescence diode emitters. At least one first group of the luminescence diode emitters is arranged in a matrix having at least two columns and at least two rows, wherein in the first group the electrical connections of a first connection type of the luminescence diode emitters of a column and the electrical connections of a second connection type of the luminescence diode emitters of a row are in each case electrically connected to one another. The electrical connections of the first connection type of different columns and the electrical connections of the second connection type of different rows of the matrix are electrically insulated from one another.

19 Claims, 3 Drawing Sheets

HEADLIGHT COMPRISING A PLURALITY OF LUMINESCENCE DIODE EMITTERS

RELATED APPLICATIONS

This is a §371 of International Application No. PCT/DE2009/001153, with an international filing date of Aug. 12, 2009 (WO 2010/034276 A1, published Apr. 1, 2010), which is based on German Patent Application No. 10 2008 049 398.8, filed Sep. 29, 2008, the subject matter of which is incorporated by reference.

TECHNICAL FIELD

This disclosure relates to a headlight comprising a plurality of luminescence diode emitters.

BACKGROUND

Headlights are known which, by way of example, have a plurality of luminescence diode emitters in the form of luminescence diode components. The luminescence diode components contain a component housing, in which at least one luminescence diode chip is mechanically and electrically mounted.

It could therefore be helpful to provide a headlight comprising luminescence diode emitters, which headlight can be realized technically in a simple manner and affords a high degree of flexibility with regard to the realization of the different headlight functions. It could also be helpful to provide different headlight functions which comprise, in particular, the formation of differently sized and differently shaped headlight emission cones.

SUMMARY

We provide a headlight including a plurality of luminescence diode emitters, at least one first group of which is arranged in a matrix having at least two columns and at least two rows, wherein the luminescence diode emitters of the first group in each case have two electrical connections of different connection types and in the first group the electrical connections of a first connection type are in each case electrically connected to one another in a column-by-column manner, the electrical connections of a second connection type are in each case electrically connected to one another in a row-by-row manner, the electrical connections of the first connection type of different columns are electrically insulated from one another, and the electrical connections of the second connection type of different rows are electrically insulated from one another.

BRIEF DESCRIPTION OF THE DRAWINGS

Further advantages, preferred configurations and developments will become apparent from the examples explained below, in conjunction with the figures.

DETAILED DESCRIPTION

Figure 1:
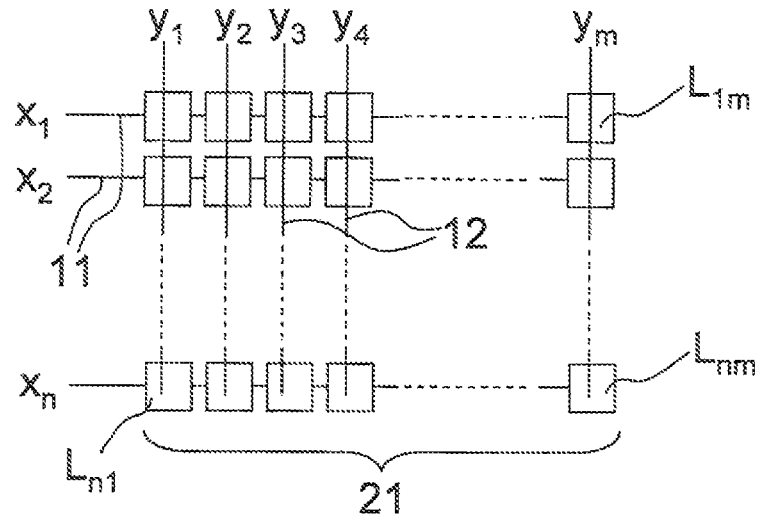
FIG. 1 shows a schematic illustration of the arrangement and electrical interconnection of the luminescence diode emitters of the headlight in accordance with a first example in a plan view.

A headlight is specified in which at least a first group of the luminescence diode emitters in each case have two electrical connections of different connection types and are arranged in a matrix having at least two columns and at least two rows.

A first connection type is, for example, the anode of the luminescence diode emitter and a second connection type is, for example, the cathode. However, this can also be interchanged and, in particular, can also be different for different groups of the luminescence diode emitters.

The matrix need not necessarily be an ordered or symmetrical arrangement. In principle, it can also have irregularities or, in plan view, an asymmetrical form.

In the first group, the electrical connections of a first connection type are in each case electrically connected to one another in a column-by-column manner and the electrical connections of a second connection type are in each case electrically connected to one another in a row-by-row manner. The electrical connections of the first connection type of different columns are electrically insulated from one another and the electrical connections of the second connection type of different rows are electrically insulated from one another. This type of electrical interconnection of the luminescence diode emitters of a group is referred to hereinafter as a "matrix interconnection."

The luminescence diode emitters of the first group are therefore not in each case individually electrically conductively contact-connected and drivable completely independently of one another. Moreover, serial driving of a plurality of luminescence diode emitters is not provided at least in the case of the first group. Instead, the individual luminescence diode emitters of the first group are electrically connected to one another in a matrix interconnection.

This type of interconnection makes it possible to reduce the number of electrical connections driving the luminescence diode emitters compared with individual driving. At the same time, such an interconnection of luminescence diode emitters affords a high degree of flexibility with regard to the realization of different headlight functions. Furthermore, this type of interconnection can enable the luminescence diode emitters to be arranged particularly closely to one another.

The headlight can also have luminescence diode emitters which are not arranged in a matrix and electrically conductively connected to other luminescence diode emitters in a matrix interconnection.

In accordance with one example of the headlight, the first group is the sole arrangement of luminescence diode emitters in a matrix having at least two columns and at least two rows in which luminescence diode emitters in each case have two electrical connections of different connection types and the electrical connections of a first connection type are in each case electrically connected to one another in a column-by-column manner, the electrical connections of a second connection type are in each case electrically connected to one another in a row-by-row manner, the electrical connections of the first connection type of different columns are electrically insulated from one another, and the electrical connections of the second connection type of different rows are electrically insulated from one another. This example can be realized in a technically simple manner.

An alternative headlight provides for at least one second group of luminescence diode emitters to be contained. The luminescence diode emitters of the second group in each case have two electrical connections of different connection types. In the second group, the electrical connections of a first connection type are in each case electrically connected to one another in a column-by-column manner, the electrical connections of a second connection type are in each case electrically connected to one another in a row-by-row manner, the electrical connections of the first connection type of different columns are electrically insulated from one another, and the electrical connections of the second connection type of different rows are electrically insulated from one another.

In this case, the first connection type of the second group need not be the same connection type as the first connection type of the first group or of another group. Generally, in the interconnection, rows can also be interchanged with columns. What is crucial is that each group has a matrix interconnection, with a row-by-row interconnection of first electrical connections and a column-by-column interconnection of second electrical connections, or vice-versa. The first electrical connections and the second electrical connections within a group must have a different connection type. By way of example, the first connection type in the first group can be the cathode, while the first connection type in the second group is the anode. This can also be interchanged, of course. The first connection type of the first group can be identical to the first connection type of the second group.

The electrical connections of the luminescence diode emitters of the first group are electrically insulated from the electrical connections of the luminescence diode emitters of the second group.

The example of the headlight comprising at least two groups of luminescence diode emitters which in each case have the specified matrix interconnection among one another can afford for specific headlight functions to be realized, improved drivability by comparison with a headlight comprising a single group of luminescence diode emitters having a matrix intercom-nection among one another.

In one development of the headlight comprising the first and the second group of luminescence diode emitters, this headlight has a headlight function in which at least some of the luminescence diode emitters of the first and of the second group are operated. One or a plurality of luminescence diode emitters of the first group, of the second group or both of the first and of the second group are not operated in the headlight function. This measure also makes it possible to realize advantageous driving of the luminescence diode emitters. In principle, a multiplicity of luminous patterns can be generated such that novel headlight functions are also possible.

In an additional example of the headlight, more than half of the luminescence diode emitters are contained in the first group.

One configuration of the headlight provides for the latter to have a headlight function in which at least a portion of the luminescence diode emitters is operated for generating a headlight cone and at least one first and one second portion of the operated luminescence diode emitters are operated in a serial pulsed operation mode. In the headlight function, therefore, the first and the second portion of the operated luminescence diode emitters are not operated continuously, but rather in each case repeatedly switched on and off.

In the headlight function with serial pulsed operation, in a further example it is additionally provided that a further portion of the luminescence diode emitters is operated continuously.

In the example of the headlight having the headlight function with serial pulsed operation, in one development it is provided that in the headlight function, luminescence diode emitters from the first group and from at least one further group are contained in the first portion, in the second portion or both in the first and in the second portion of the operated luminescence diode emitters. The luminescence diode emitters in the further group are arranged in a matrix having at least two columns and at least two rows. In the further group, analogously to the first group, the luminescence diode chips are electrically connected to one another with a matrix interconnection.

The first connection type of the electrical connections of the further group need not be identical to the first connection type of the electrical connections of the first group. The further group can be the second group or else a third or other further group of luminescence diode emitters.

In one expedient example, the headlight is a front headlight for a means of locomotion, in particular, for a motor vehicle.

In accordance with one configuration, the headlight has at least two different headlight functions such that differently shaped headlight cones can be emitted.

In the headlight, in accordance with one configuration, directly adjacent luminescence diode emitters of at least the first group have a distance of less than or equal to 100 µm or no distance with respect to one another.

In one advantageous example of the headlight, some or all of the luminescence diode emitters consist of one luminescence diode chip or of a plurality of luminescence diode chips. Therefore, such luminescence diode emitters are not components having a component housing with the luminescence diode chip integrated therein, rather housing-free luminescence diode chips as such are integrated directly in the headlight.

In a further-reaching configuration of the headlight, at least one luminescence diode chip is contained which has two or more luminescence diode emitters. The integration of two or more luminescence diode emitters into a luminescence diode chip makes it possible to further reduce the distance between the luminescence diode emitters and to realize a headlight having a high luminance. In principle, all luminescence diode emitters of a group can be integrated in a single luminescence diode chip.

In a further configuration of the headlight, at least one luminescence diode emitter adjoins the first group or, if present, the second group or a possible further group. One of the electrical connections of the at least one luminescence diode emitter is electrically connected to the electrically interconnected connections of a column or of a row of the corresponding group.

In one expedient example of the headlight, each of the luminescence diode emitters is operated with an operating current of >0.1 A, preferably of >0.5 A and particularly preferably of >0.8 A.

The matrix of the respective group of luminescence diode emitters need not necessarily be a symmetrical matrix in the sense that all rows in each case have the same number of luminescence diode emitters and all columns likewise in each case have the same number of luminescence diode emitters. Instead, it is possible for one or a plurality of rows to have more or fewer luminescence diode emitters than the other rows. The same correspondingly applies to the columns of a group.

In the examples and figures, identical or identically acting constituent parts are in each case provided with the same reference symbols. The constituent parts illustrated and also the size relationships of the constituent parts among one another should not be regarded as true to scale. Moreover, some details of the drawings may be illustrated with an exaggerated size to afford a better understanding.

Only the luminescence diode emitters of the respective headlight and the respective electrical interconnection and arrangement of the emitters relative to one another are illustrated in the drawings.

The drawings do not illustrate, for example, a possible carrier of the headlight, on which the luminescence diode emitters are arranged, possible optical units disposed downstream of the luminescence diode emitters in the emission direction, a possible housing of the headlight or possible electronic drive circuits for electrically driving the luminescence diode emitters and for setting different headlight functions of the headlight. Some or all of these details can be contained in the headlight.

Possible examples of such details of a headlight are generally known to those skilled in the art. Therefore, such details have been omitted in the drawings for the sake of clarity and to afford a better understanding.

FIG. 1 illustrates a multiplicity of luminescence diode emitters L of a first example of the headlight. The headlight has a first group 21 of luminescence diode emitters L. All the luminescence diode emitters L are contained in the first group 21. The luminescence diode emitters L are arranged in a matrix having n rows $x_1$ to $x_n$, and having m columns $y_1$ to $y_m$.

The arrangement of the luminescence diode emitters L within a row x or a column y can be, as illustrated, along a straight line. However, this is not absolutely necessary. Rather, the rows or columns x, y can also be formed with luminescence diode emitters L arranged, for example, along a curved line or along a line with bends. In the case of an arrangement along a straight line, the columns and rows need not necessarily in each case be oriented parallel to one another.

The term "row" or "column" relates to the relative interconnection of the luminescence diode emitters L with respect to one another and is largely independent of a specific geometrical arrangement of the luminescence diode emitters. In accordance with one example of the headlight, the luminescence diode emitters of a row or of a column in each case succeed one another directly spatially, that is to say that, with regard to a specific row x, for example, no luminescence diode emitters L of another row are arranged between the luminescence diode emitters L of the specific row.

In the first group 21, the electrical connections of a first connection type are in each case electrically connected to one another in each column y. The electrical connections of a second connection type are in each case electrically connected to one another in each row x.

The electrical connections of the first connection type are in each case electrically conductively connected to one another in a row-by-row manner by an electrical conductor 11. Correspondingly, the electrical connections of the second connection type are in each case electrically connected to one another in a column-by-column manner and by an electrical conductor 12. The electrical conductors 11, 12 can in each case be embodied in one piece. Alternatively, however, the electrical conductors 11, 12 can also in each case have a plurality of segments, which, in particular, can also be spatially disposed at a distance from one another.

By virtue of this matrix interconnection of the luminescence diode emitters L of the first group, efficient driving of the luminescence diode emitters L is possible and, in principle, it is possible to realize a multiplicity of different emission patterns or emission cones with the headlight.

If a voltage is applied to the row $x_1$ and to the column $y_m$, only the luminescence diode emitter $L_{1m}$ is luminous. If a voltage is applied to the row $x_n$ and the column $y_1$, only the luminescence diode emitter $L_{n1}$ is luminous. If, in this case, a voltage is additionally applied to the column $y_m$, then $L_{nm}$ is luminous in addition to $L_{n1}$. If a voltage is applied to all columns $y_1$ to $y_m$ and all rows $x_1$ to $x_n$, all luminescence diode emitters L of the first group 21 are luminous.

In the case where the luminescence diode emitters L of the first group 21 are driven with serial pulsed operation, it is possible to realize headlight cones using any desired selection of the luminescence diode emitters L of the first group 21. Furthermore, it is also possible, of course, to operate some or all luminescence diode emitters permanently or to provide, in the driving electronics of the first group 21, headlight functions in which one portion of the operated luminescence diode emitters L is operated permanently and a further portion is operated in the pulsed operation mode.

Figure 2:
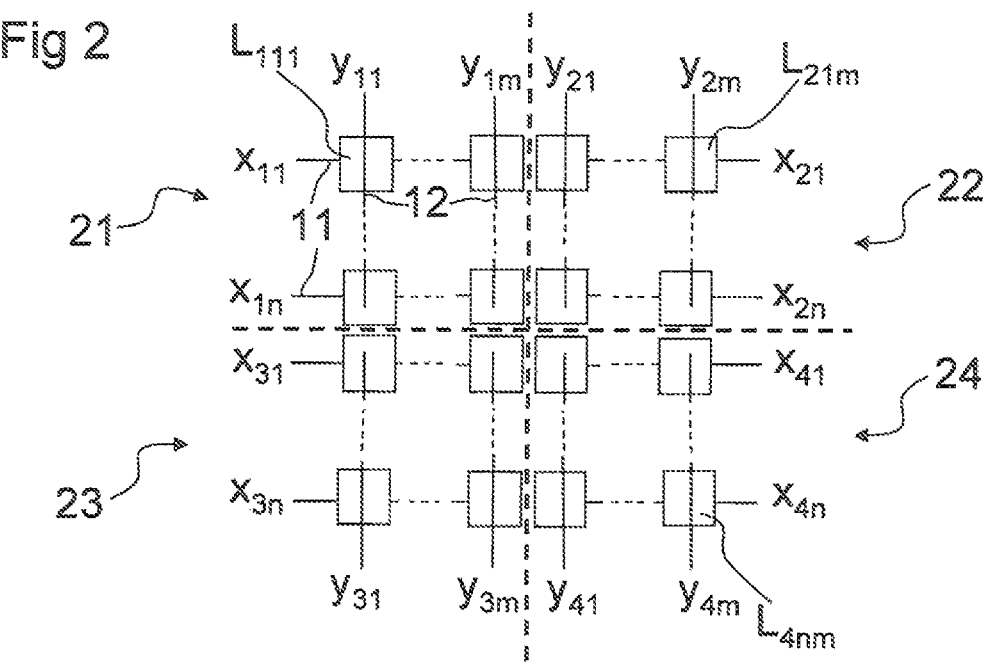
FIG. 2 shows a schematic illustration of the arrangement and electrical interconnection of the luminescence diode emitters of the headlight in accordance with a second example in a plan view.

Since, for the realization of specific emission patterns, the number of subgroups of luminescence diode emitters L which are put into operation sequentially one after the other in the pulsed operation mode can be disadvantageously large, the example illustrated in FIG. 2 provides not only a first group 21 of luminescence diode emitters L in matrix interconnection, but additionally a second group 22, a third group 23 and a fourth group 24.

In principle, there can be any desired number of such groups in which the luminescence diode emitters L are electrically conductively connected to one another in the matrix circuit described above. Despite a plurality of groups of luminescence diode emitters, all the luminescence diode emitters of the headlight can be mounted very close together, without the distances for wiring or other circuitry being required.

In the headlight illustrated in FIG. 2, by way of example, by driving the rows and columns $x_{11}$, $y_{11}$, $y_{1m}$; $x_{3n}$, $y_{31}$, $y_{3m}$; and $x_{41}$, $y_{41}$ and $y_{4m}$, it is possible for exclusively the luminescence diode emitters $L_{111}$, $L_{11m}$, $L_{3n1}$, $L_{3nm}$, $L_{411}$ and $L_{41m}$ to be put into operation. In the case of the indices of the luminescence diode emitters L, the first place denotes the number of the group, the second place denotes the row and the third place denotes the column.

Figure 3:
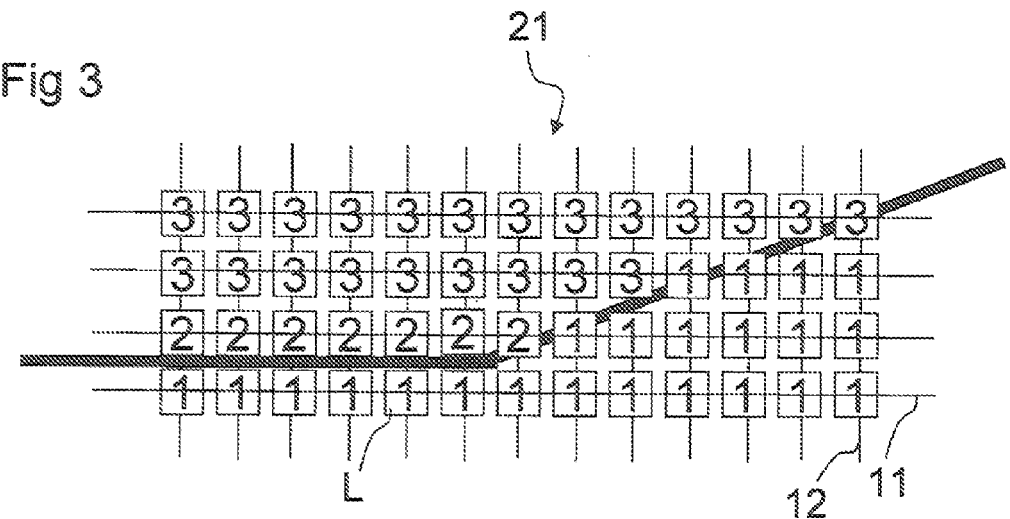
FIG. 3 shows a schematic plan view of the luminescence diode emitters of the headlight in accordance with a third example.

In the third example illustrated in FIG. 3, luminescence diode emitters L for different headlight functions are identified by reference symbols. Luminescence diode emitters 1 for a first headlight function, luminescence diode emitters 2 for a second headlight function and luminescence diode emitters 3 for a third headlight function.

In the case of the first headlight function, only the luminescence diode emitters 1 are put into operation. Since all the luminescence diode emitters L of the headlight are contained in a first group 21 and are electrically conductively connected to one another by a matrix interconnection, a serial pulsed operation mode is necessary for this purpose. The first headlight function corresponds, for example, to a low-beam light for a motor vehicle, in which the upper part of the emitted headlight cone has a bend of approximately 15° in cross section. This is indicated in FIG. 3 by the thick black lines, which correspondingly form an angle of approximately 165°.

In the case of a second headlight function, the luminescence diode emitters 2 are put into operation in addition to the luminescence diode emitters 1. This is also effected in the pulsed operation mode.

In the case of a third headlight function, by way of example, all luminescence diode emitters 1, 2, 3 are put into operation. This is effected, for example, in the continuous operation mode of the luminescence diode emitters. The third headlight function is, for example, a high-beam light for a motor vehicle.

Figure 4:
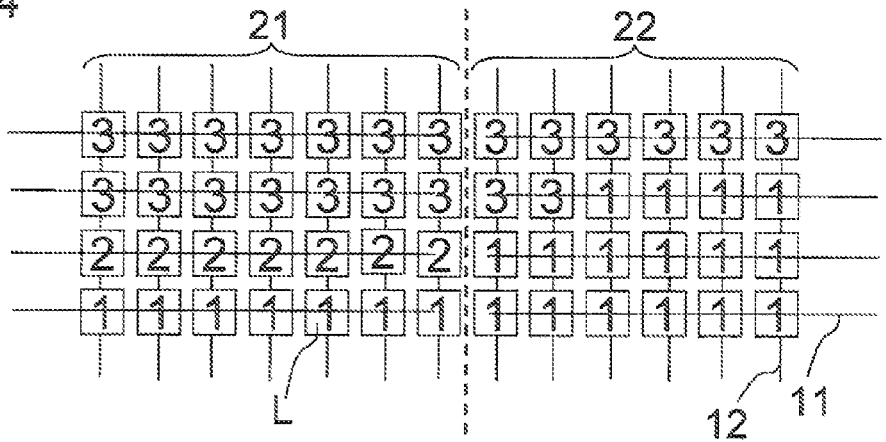
FIG. 4 shows a schematic plan view of the luminescence diode emitters of the headlight in accordance with a fourth example.

In the fourth example illustrated in FIG. 4, in contrast to the third example, the headlight has a first group 21 and a second group 22 of luminescence diode emitters L. The groups 21, 22 are electrically insulated from one another, which is illustrated by the dashed line. By virtue of the classification and interconnection in two groups 21, 22, it is possible, for example, for the luminescence diode emitters of the first group 21 to be operated permanently in all three headlight functions. In the case of the luminescence diode emitters of the second group 22, by contrast, a pulsed operation mode is required for the first headlight function.

Figure 5:
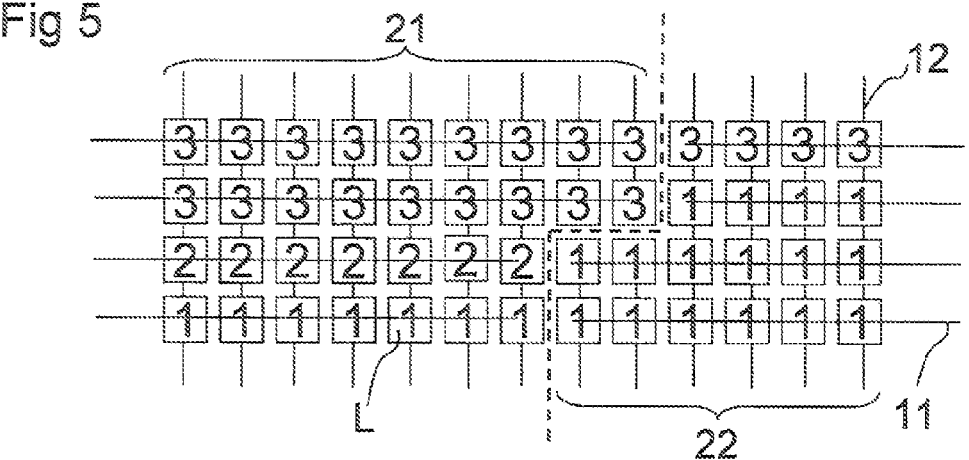
FIG. 5 shows a schematic plan view of the luminescence diode emitters of the headlight in accordance with a fifth example.

In the fifth example illustrated with reference to FIG. 5, the headlight likewise has a first group 21 and a second group 22 of luminescence diode emitters. In contrast to the fourth example, however, the boundary between the first and the second group 21, 22 extends differently. The boundary is illustrated by the dashed line. The groups are formed in such a way that each group contains rows or columns which have more luminescence diode emitters than other rows or columns of the group.

By virtue of this division of the groups 21, 22, it is possible that all three headlight functions can be realized only with continuous operation of the luminescence diode emitters. Supplementarily, of course, a pulsed operation mode can also be provided, for example, for further, novel headlight functions.

Figure 6:
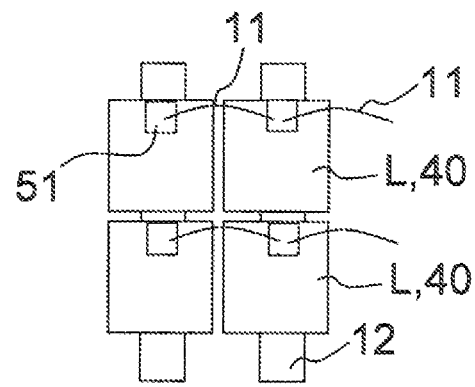
FIG. 6 shows a schematic plan view of a portion of the luminescence diode emitters of the headlight in accordance with a sixth example.

The luminescence diode emitters are preferably integrated in the form of luminescence diode chips 40 in the headlight. This is illustrated in FIGS. 6 and 7.

Electrical connections 51 of a first connection type are formed, for example, on a side of the luminescence diode chips 40 which faces in the main emission direction of the luminescence diode chips. The electrical connections 51 can be embodied in the form of bonding pads, for example.

The electrical connections 51 are electrically conductively connected to one another in a row-by-row manner or in a column-by-column manner by bonding wires 11, for example. As an alternative to bonding wires, the electrical connections 51 can be connected to one another by any other known electrical connecting means.

Figure 7:
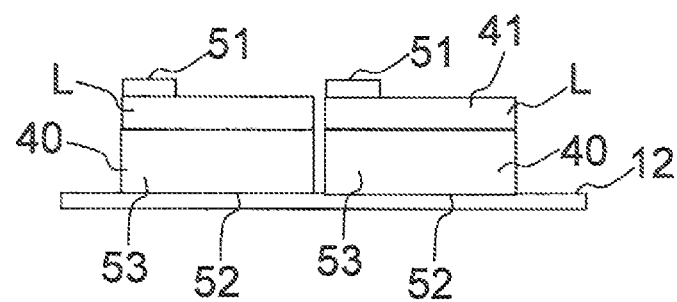
FIG. 7 shows a schematic side view of two of the luminescence diode emitters illustrated in FIG. 6.

Electrical connections 52 of a second connection type are arranged, for example, on a side of the luminescence diode chips 40 which faces away from the main emission direction of the luminescence diode chips, see FIG. 7. A plurality of electrical connections 52 can be connected by a conductor track, for example, on which they are electrically conductively mounted, e.g., by solder or electrically conductive adhesive.

Each luminescence diode chip has, for example, an epitaxial semiconductor layer sequence 41 and a substrate or a carrier body 53. The epitaxial semiconductor layer sequence 41 comprises an active zone suitable for emitting electromagnetic radiation. The epitaxial semiconductor layer sequence has, for example, a plurality of layers comprising or composed of a III/V compound semiconductor material.

A III/V compound semiconductor material comprises at least one element from the third main group, such as, for example, B, Al, Ga, In, and an element from the fifth main group, such as, for example, N, P, As. In particular, the term "III/V compound semiconductor material" encompasses the group of the binary, ternary or quaternary compounds which contain at least one element from the third main group and at least one element from the firth main group, for example, nitride and phosphide compound semiconductors. Such a binary, ternary or quaternary compound can additionally comprise, for example, one or a plurality of dopants and additional constituents.

In a further configuration, the luminescence diode chip is a thin-film light-emitting diode chip. In particular, it has a carrier substrate. A thin-film luminescence diode chip is distinguished by at least one of the following characteristic features:

a reflective layer is applied or formed at a main area (facing a carrier element, in particular the carrier substrate) of the epitaxial semiconductor layer sequence, the reflective layer reflecting at least part of the electromagnetic radiation generated in the semiconductor layer sequence back into the latter;

the thin-film light-emitting diode chip has a carrier element, which is not the growth substrate on which the semiconductor layer sequence was grown epitaxially, but rather a separate carrier element, which was subsequently fixed to the semiconductor layer sequence;

the semiconductor layer sequence has a thickness in the range of 20 µm or less, in particular in the range of 10 µm or less;

the semiconductor layer sequence is free of a growth substrate. "Free of a growth substrate" means that a growth substrate possibly used for the growth process has been removed from the semiconductor layer sequence or at least greatly thinned. In particular, it has been thinned in such a way that it is not self-supporting by itself or together with the epitaxial layer sequence alone. The remaining residue of the greatly thinned growth substrate is, in particular, unsuitable as such for the function of a growth substrate; and the semiconductor layer sequence contains at least one semiconductor layer having at least one area which has an intermixing structure which ideally leads to an approximately ergodic distribution of the light in the semiconductor layer sequence, that is to say that it has an as far as possible ergodically stochastic scattering behavior. Expressed in general terms, the intermixing structure has structures which are suitable for deflecting, diverting or scattering electromagnetic radiation.

A basic principle of a thin-film light-emitting diode chip is described, for example, in Schnitzer et al., Appl. Phys. Lett. 63 (16) Oct. 18, 1993, pages 2174-2176, the disclosure of which is hereby incorporated by reference. Examples of thin-film light-emitting diode chips are described in EP 0 905 797 A2 and WO 02/13281 A1, the disclosure of which in is hereby likewise incorporated by reference.

A thin-film light-emitting diode chip is, to a good approximation, a Lambertian surface emitter and is therefore well suited, for example, to application in a headlight, for instance a motor vehicle headlight.

Figure 8:
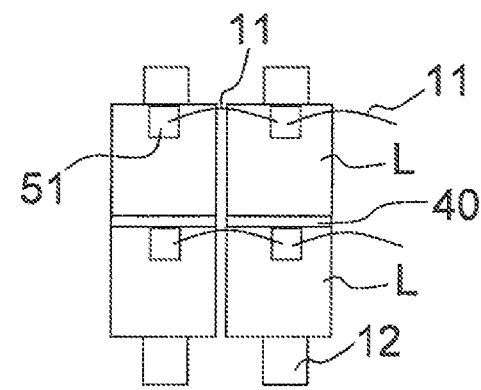
FIG. 8 shows a schematic plan view of a portion of the luminescence diode emitters of the headlight in accordance with a seventh example.
Figure 9:
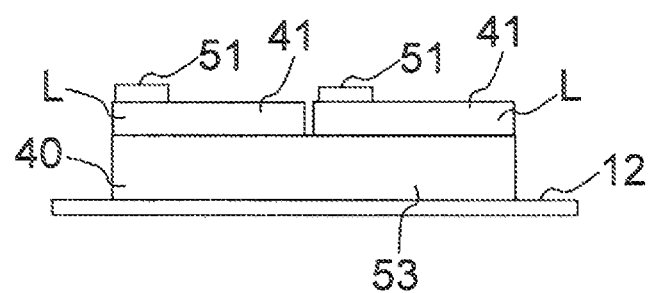
FIG. 9 shows a schematic side view of two of the luminescence diode emitters illustrated in FIG. 8.

In the examples illustrated in FIGS. 8 and 9, in contrast to the example illustrated above with reference to FIGS. 6 and 7, two luminescence diode emitters L are formed by a single luminescence diode chip 40. By way of example, the luminescence diode chip 40 has two regions of the epitaxial semiconductor layer sequence 41, which are not directly electrically connected to one another, but rather only via the substrate or the carrier body 40, for example. Each of these two parts of the semiconductor layer sequence 41 has a dedicated electrical connection 51, such that effectively two luminescence diode emitters L are formed within the chip 40, which luminescence diode emitters can be driven independently of one another.

In principle, it is also possible, for example, for as many luminescence diode emitters as desired to be integrated in a single luminescence diode chip 40. By way of example, whole rows or whole columns of a group of luminescence diode emitters of the headlight can be integrated within an elongated luminescence diode chip embodied in an integral fashion.

It is also possible, for example, to form a whole group of luminescence diode emitters of the headlight within a single luminescence diode chip. In this case, the interconnection is ensured, for example, at least partly internally in the luminescence diode chip 40, that is to say that the luminescence diode chip is produced in such a way that the matrix interconnection of the luminescence diode emitters L is at least partly already realized in it.

This disclosure is not restricted to the examples by the description on the basis of the examples. Rather, the disclosure encompasses any novel feature and also any combination of features, which in particular includes any combination of features in the appended claims, even if this feature or this combination itself is not explicitly specified in the claims or examples.

The invention claimed is:

1. A headlight comprising:
a plurality of luminescence diode emitters, at least one first group of which is arranged in a matrix having at least two columns and at least two rows, wherein the luminescence diode emitters of the first group in each case have two electrical connections of different connection types and in the first group,
the electrical connections of a first connection type are in each case electrically connected to one another in a column-by-column manner, the electrical connections of a second connection type are in each case electrically connected to one another in a row-by-row manner,
the electrical connections of the first connection type of different columns are electrically insulated from one another, and the electrical connections of the second connection type of different rows are electrically insulated from one another,
at least one second group of luminescence diode emitters arranged in a matrix having at least two columns and at least two rows, wherein the luminescence diode emitters of the second group in each case have two electrical connections of different connection types and in the second group the electrical connections of a first connection type are in each case electrically connected to one another in a column-by-column manner, the electrical connections of a second connection type are in each case electrically connected to one another in a row-by-row manner, and
the electrical connections of the first connection type of different columns are electrically insulated from one another, and the electrical connections of the second connection type of different rows are electrically insulated from one another.

2. The headlight as claimed in claim 1,
wherein the first group is a sole arrangement of luminescence diode emitters in a matrix having at least two columns and at least two rows in which the electrical connections of a first connection type are in each case electrically connected to one another in a column-by-column manner, electrical connections of a second connection type are in each case electrically connected to one another in a row-by-row manner, and
the electrical connections of the first connection type of different columns are electrically insulated from one another, and the electrical connections of the second connection type of different rows are electrically insulated from one another.

3. The headlight as claimed in claim 1, wherein at least some of the luminescence diode emitters of the first and of the second group are operated and one or more luminescence diode emitters of the first group, of the second group or both of the first and of the second group are not operated.

4. The headlight as claimed in claim 1, wherein more than half of the luminescence diode emitters are contained in the first group.

5. The headlight as claimed in claim 1, wherein at least a portion of the luminescence diode emitters is operated to generate a headlight cone and at least one first and one second portion of the operated luminescence diode emitters are operated in a serial pulsed operation mode.

6. The headlight as claimed in claim 5, wherein a further portion of the operated luminescence diode emitters is operated continuously.

7. The headlight as claimed in claim 6,
wherein luminescence diode emitters from the first group and from at least one further group are contained in the first portion, in the second portion or both in the first and in the second portion of the operated luminescence diode emitters, wherein the luminescence diode emitters in the further group in each case have two electrical connections of different connection types and in the further group,
the electrical connections of a first connection type are in each case electrically connected to one another in a column-by-column manner, the electrical connections of a second connection type are in each case electrically connected to one another in a row-by-row manner, and
the electrical connections of the first connection type of different columns are electrically insulated from one another, and the electrical connections of the second connection type of different rows are electrically insulated from one another.

8. The headlight as claimed in claim 6,
wherein luminescence diode emitters from the first group and from at least one further group are contained in the first portion, M the second portion or both in the first and in the second portion of the operated luminescence diode emitters, wherein the luminescence diode emitters in the further group in each case have two electrical connections of different connection types and in the further group,
the electrical connections of a first connection type are in each case electrically connected to one another in a column-by-column manner, the electrical connections of a second connection type are in each case electrically connected to one another in a row-by-row manner, and the electrical connections of the first connection type of different columns are electrically insulated from one another, and the electrical connections of the second connection type of different rows are electrically insulated from one another.

9. The headlight as claimed in claim 1, which is a front headlight for a means of locomotion.

10. The headlight as claimed in claim 1, which has at least two different headlight functions having differently shaped headlight cones.

11. The headlight as claimed in claim 1, wherein directly adjacent luminescence diode emitters of at least the first group have a distance of less than or equal to 100 μm or no distance with respect to one another.

12. The headlight as claimed in claim 1, wherein some or all of the luminescence diode emitters are contained in a luminescence diode chip or in each case consist of a luminescence diode chip.

13. The headlight as claimed in claim 1, further comprising at least one luminescence diode chip which has two or more luminescence diode emitters.

14. The headlight as claimed in claim 1, wherein an operating current of greater than 0.1 A is provided for all or at least for a large portion of the luminescence diode emitters of the first group.

15. The headlight as claimed in claim 1, which is as front headlight for a means of locomotion.

16. A headlight comprising:
a plurality of luminescence diode emitters, at least one first group of which is arranged in a matrix having at least two columns and at least two rows, wherein the luminescence diode emitters of the first group in each case have two electrical connections of different connection types and in the first group,
the electrical connections of a first connection type are in each case electrically connected to one another in a column-by-column manner, the electrical connections of a second connection type are in each case electrically connected to one another in a row-by-row manner, and
the electrical connections of the first connection type of different columns are electrically insulated from one another, and the electrical connections of the second connection type of different rows are electrically insulated from one another,
wherein the first group is a sole arrangement of luminescence diode emitters in a matrix having at least two columns and at least two rows in which the electrical connections of a first connection type are in each case electrically connected to one another in a column-by-column manner, electrical connections of a second connection type are in each case electrically connected to one another in a row-by-row manner, and
the electrical connections of the first connection type of different columns are electrically insulated from one another, and the electrical connections of the second connection type of different rows are electrically insulated from one another.

17. The headlight as claimed in claim 16, which is a front headlight torr a means of locomotion.

18. A headlight comprising:
a plurality of luminescence diode emitters, at least one first group of which is arranged in a matrix having at least two columns and at least two rows, wherein the luminescence diode emitters of the first group in each case have two electrical connections of different connection types and in the first group,
the electrical connections of a first connection type are in each case electrically connected to one another in a column-by-column manner, the electrical connections of a second connection type are in each case electrically connected to one another in a row-by-row, manner, and
the electrical connections of the first connection type of different columns are electrically insulated from one another, and the electrical connections of the second connection type of different rows are electrically insulated from one another,
wherein at least a portion of the luminescence diode emitters is operated to generate a headlight cone and at least one first and one second portion of the operated luminescence diode emitters are operated in a serial pulsed operation mode.

19. The headlight as claimed in claim 18, which is a front headlight for a means of locomotion.

* * * * *